(12) United States Patent
Malhotra et al.

(10) Patent No.: US 8,889,093 B2
(45) Date of Patent: Nov. 18, 2014

(54) HIGH PRESSURE CYROGENIC PROCESS AND SYSTEM FOR PRODUCING AMMONIA PRODUCTS

(75) Inventors: Avinash Malhotra, Sugar Land, TX (US); James H. Gosnell, Houston, TX (US); Yue Jing, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 383 days.

(21) Appl. No.: 12/883,743

(22) Filed: Sep. 16, 2010

(65) Prior Publication Data
US 2012/0070364 A1 Mar. 22, 2012

(51) Int. Cl.
*C01C 1/04* (2006.01)
*F25J 3/02* (2006.01)
*C01B 3/50* (2006.01)

(52) U.S. Cl.
CPC ............ *C01C 1/0405* (2013.01); *F25J 2200/72* (2013.01); *C01B 2203/068* (2013.01); *F25J 3/0219* (2013.01); *F25J 2200/02* (2013.01); *C01B 2203/046* (2013.01); *F25J 2240/30* (2013.01); *F25J 3/0276* (2013.01); *F25J 2240/02* (2013.01); *F25J 2210/20* (2013.01); *C01B 3/506* (2013.01)
USPC ........................................................ 423/359

(58) Field of Classification Search
CPC ................. C10J 2300/1618; C10J 2300/1621; C10J 2300/1656; C10J 2300/1668; C10J 2300/1861; C10J 2300/1884; C01C 1/04; C01C 1/0405; C01B 3/025; C01B 3/02; C01B 2203/0465; C01B 2203/068; C01B 2203/0445; C01B 3/586
USPC ............. 252/372; 423/351, 359; 62/600, 931, 62/617–620
See application file for complete search history.

(56) References Cited

U.S. PATENT DOCUMENTS

| | | | |
|---|---|---|---|
| 3,442,613 A | 5/1969 | Grotz, Jr. | |
| 3,549,335 A | 12/1970 | Grotz, Jr. | |
| 3,572,046 A | 3/1971 | Grotz, Jr. | |
| 3,805,536 A | 4/1974 | Lynn | |
| 4,296,085 A * | 10/1981 | Banquy | 423/359 |
| 4,298,588 A | 11/1981 | Pinto | |
| 4,383,982 A | 5/1983 | Pinto | |

(Continued)

FOREIGN PATENT DOCUMENTS

EP 0289877 B1 * 11/1988

OTHER PUBLICATIONS

Air Liquide, "Syngas Purification Units: From Gasification to Chemicals" Sep. 22, 2009, pp. 1-6.*

(Continued)

*Primary Examiner* — Stanley Silverman
*Assistant Examiner* — Justin Bova
(74) *Attorney, Agent, or Firm* — Gary M. Machetta

(57) ABSTRACT

Systems and methods for producing ammonia and/or ammonia products. The ammonia and/or ammonia products can be produced by compressing a gas mixture comprising nitrogen, hydrogen, methane, and argon to produce a compressed gas mixture having a pressure of from about 1,000 kPa (130 psig) to about 10,400 kPa (1,495 psig). All or a portion of the compressed gas mixture can be selectively separated at cryogenic conditions to produce a first gas comprising nitrogen and hydrogen, and a second gas comprising methane, argon, residual hydrogen and nitrogen. At least a portion of the first gas can be reacted at conditions sufficient to produce an ammonia product.

20 Claims, 5 Drawing Sheets

(56) References Cited

U.S. PATENT DOCUMENTS

| | | | |
|---|---|---|---|
| 4,409,196 A | 10/1983 | Skinner et al. | |
| 4,549,890 A | 10/1985 | Bligh | |
| 4,568,530 A | 2/1986 | Mandelik et al. | |
| 4,613,492 A | 9/1986 | Winter | |
| 4,636,334 A * | 1/1987 | Skinner et al. | 252/377 |
| 4,681,745 A | 7/1987 | Pinto | |
| 4,780,298 A | 10/1988 | Kowal | |
| 4,792,441 A | 12/1988 | Wang et al. | |
| 4,981,669 A | 1/1991 | Pinto | |
| 5,011,625 A * | 4/1991 | Le Blanc | 252/376 |
| 5,068,058 A | 11/1991 | Bushinsky et al. | |
| 5,180,570 A | 1/1993 | Lee et al. | |
| 5,935,544 A | 8/1999 | Bhakta | |
| 6,178,774 B1 | 1/2001 | Billy et al. | |
| 6,190,632 B1 * | 2/2001 | Shah et al. | 423/352 |
| 6,620,399 B1 | 9/2003 | Jungerhans | |
| 7,090,816 B2 * | 8/2006 | Malhotra et al. | 423/359 |
| 2002/0102200 A1 * | 8/2002 | Jungerhans | 423/359 |
| 2004/0182002 A1 | 9/2004 | Malhotra et al. | |
| 2010/0115991 A1 | 5/2010 | Jungerhans | |

OTHER PUBLICATIONS

Mega-ammonia round-up, Nitrogen & Methanol, Jul.-Aug. 2002, pp. 39-48, Issue No. 258.

Rhodes, Anne K., New ammonia process, catalyst proven in Canadian plant, Oil & Gas Journal, Nov. 18, 1996, pp. 37-41.

Strait, Rick., Grassroots success with KAAP, Nitrogen & Methanol, Mar.-Apr. 1999, pp. 37-43, Issue No. 238.

KBR-Ammonia: Purifier Ammonia Process, http://www.theyesmen.org/agribusiness/halliburton/kbr/hydroChem/fertSynGas/purifierProcess.html.

KBR-Ammonia: KAAPplus Ammonia Process, http://www.kbr.com/industries/energy_and_chemicals/downstream/ammonia_and_syngas/kaapplus_ammonia_process.aspx.

* cited by examiner

HIGH PRESSURE CYROGENIC PROCESS AND SYSTEM FOR PRODUCING AMMONIA PRODUCTS

BACKGROUND OF THE INVENTION

1. Field of the Invention

Embodiments of the present invention generally relate to systems and method for producing ammonia and ammonia products. More particularly, embodiments of the present invention relate to systems and methods using high pressure cryogenic separation for producing ammonia and ammonia products.

2. Description of the Related Art

Synthesis gas or simply "syngas" is typically the product of gasifying a carbon containing material in the presence of an oxidant at high temperatures and pressures. Depending on the starting materials, syngas is usually rich in carbon monoxide and hydrogen, and can also contain varying amounts of methane, carbon monoxide, nitrogen, and argon.

As the name suggests, syngas is often used for the synthesis of chemicals or synthetic hydrocarbon fuels. Syngas can be used as a fuel to generate electricity or steam and as a source of hydrogen. Syngas can also be used to produce a wide range of products, such as fuels, chemicals, fertilizers, and industrial gases.

Ammonia, for example, is commonly produced from syngas. An ideal syngas for ammonia ($NH_3$) synthesis will have a molar ratio of 3 moles hydrogen to 1 mole of nitrogen. Contaminants such as oxygen, methane, and excess nitrogen can detrimentally interfere with the ammonia conversion reaction and are removed prior to introducing the syngas to the ammonia synthesis reactors. Various methods and technologies for separating those undesirable gaseous components to yield a purified syngas containing a pure syngas having a 3:1 molar ratio of hydrogen to nitrogen have been used. For example, membranes, molecular sieves, and/or cryogenic separation techniques have been employed, alone or in combination, to remove such contaminants to yield a synthesis gas having the appropriate molar ratio.

Cryogenic separation is a frequently employed technique for separating contaminants and excess nitrogen from the raw syngas. Using this technique, the raw syngas is typically fed through a cryogenic separation system prior to compressing the syngas for feed to a synthesis reactor. Within the cryogenic separation system, contaminants, including excess nitrogen, carbon monoxide, methane and argon, are scrubbed from the syngas using a cryogenic fluid such as liquid nitrogen. The contaminants are removed and the purified syngas, containing the optimal ratio of hydrogen to nitrogen is recovered, compressed and introduced to the ammonia synthesis reactor where the nitrogen and hydrogen react, forming ammonia.

However, the syngas pressure entering the cryogenic separation system is frequently insufficient to provide the necessary refrigeration required to separate the contaminants; thus, additional compression of the syngas is required upstream of the cryogenic separation system. The pressure drop through the cryogenic separation system (approximately 300 kPa (30 psig) to 500 kPa (60 psig)) can also decrease the available pressure on the suction side of the ammonia synthesis compressor; thereby requiring additional power to compress the syngas feed to the ammonia synthesis reactor pressure requirements.

There is a need, therefore, for an improved, more energy efficient process for removing contaminants, including excess nitrogen, carbon monoxide, methane and argon from a syngas prior to ammonia production.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Systems and methods for producing ammonia are provided. An illustrative method for producing ammonia can include compressing a gas mixture comprising nitrogen, hydrogen, methane, and argon to produce a compressed gas mixture having a pressure of from about 1,000 kPa (130 psig) to about 10,400 kPa (1,495 psig). All or a portion of the compressed gas mixture can be selectively separated at cryogenic conditions to produce a first gas comprising nitrogen and hydrogen, and a second gas comprising methane, argon, residual hydrogen and excess nitrogen. At least a portion of the first gas can be reacted at conditions sufficient to produce an ammonia product.

Figure 1:
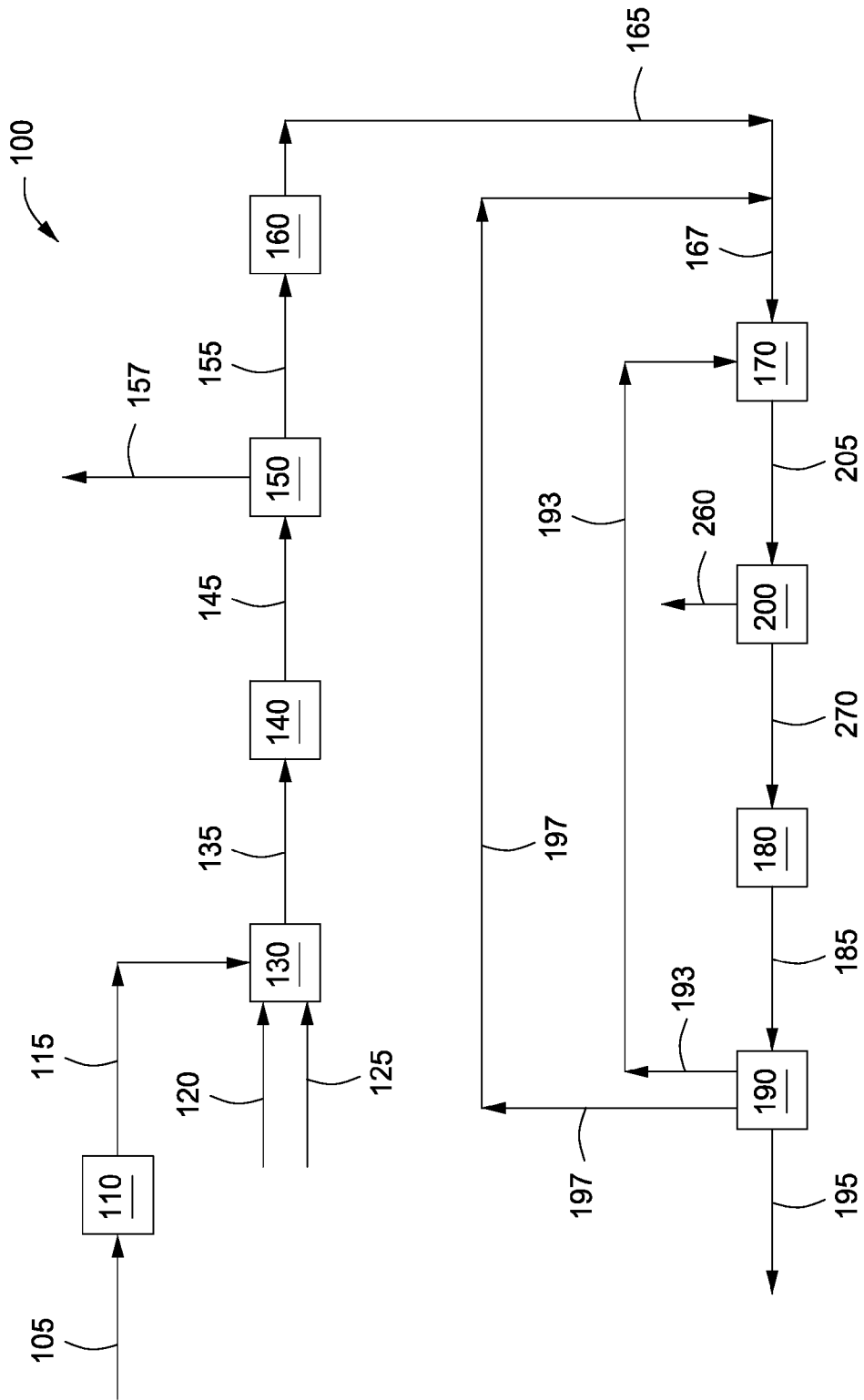
FIG. 1 depicts an illustrative system for producing ammonia and ammonia products, according to one or more embodiments described.

FIG. 1 depicts an illustrative system 100 for producing ammonia and/or ammonia products according to one or more embodiments. The system 100 can include one or more reformers 130, converters 140, carbon dioxide separators 150, methanators 160, compressors 170, separators 200, ammonia converters 180, and ammonia condensers 190. The separator 200 can be located on the discharge side of the ammonia compressor 170. The placement of the separator 200 on the discharge side of the ammonia compressor 170 can reduce the pressure drop on the suction side of the ammonia compressor 170, thereby reducing the power consumed by the ammonia compressor 170. Additionally, the gas introduced at the high pressure to the separator 200 can provide greater autorefrigeration potential, thereby reducing the overall power consumption within the separator 200.

A hydrocarbon via line 120, steam via line 125, and one or more oxidants via line 115 can be introduced to the reformer 130 to provide or produce a gas mixture ("first mixture") via line 135. The first mixture in line 135 can include, but is not limited to, carbon dioxide ($CO_2$), carbon monoxide (CO), hydrogen, nitrogen, argon, water, and methane. The molar ratio of steam-to-oxygen in the reformer 130 can range from about 0.6:1 to about 2:1, about 0.8:1 to about 1.8:1, or about 1:1 to about 1.6:1. The molar ratio of oxygen-to-carbon in the reformer 130 can range from about 0.3:1 to about 1:1, about 0.5:1 to about 0.8:1, or about 0.6:1 to about 0.7:1.

The hydrocarbon in line 120 can include one or more solid, liquid, or gaseous hydrocarbons, mixtures thereof, or any combination thereof. For example, the hydrocarbon in line 120 can include one or more commercially available gases such as methane, ethane, and/or propane. The hydrocarbon in line 120 can have a methane concentration ranging from about 30 percent by volume ("vol %") to about 99 vol %, about 50 vol % to about 99 vol %, or from about 75 vol % to about 99 vol %. The hydrocarbon in line 120 can also include $C_2$ and heavier hydrocarbons. The pressure of the hydrocarbon in line 120 can range from about 700 kPa (90 psig) to about 5,500 kPa (785 psig), about 1,000 kPa (130 psig) to about 4,000 kPa (565 psig) or about 1,400 kPa (190 psig) to about 4,000 kPa (565 psig). The pressure of the steam in line 125 can range from about 700 kPa (90 psig) to about 5,500 kPa (785 psig), about 1,000 kPa (130 psig) to about 4,000 kPa (565 psig) or about 1,400 kPa (190 psig) to about 4,000 kPa (565 psig).

One or more oxidants via line 105 can be introduced to one or more compressors 110 to provide or produce a compressed oxidant via line 115. The oxidant can be air, containing about 21 mol % oxygen, about 78 mol % nitrogen, and about 1 mol % argon. In another example, the oxidant can be oxygen enriched air supplied from an air separation unit (not shown) containing from about 21 mol % to about 99 mol %, about 21 mol % to about 75 mol % or about 21 mol % to about 50 mol % oxygen. The oxidant in line 115 can be at a pressure ranging from about 700 kPa (90 psig) to about 5,500 kPa (785 psig), about 1,000 kPa (130 psig) to about 4,000 kPa (565 psig), or about 1,400 kPa (190 psig) to about 4,000 kPa (565 psig).

The reformer 130 can include any system, device, or combination of systems and/or devices suitable for reforming the hydrocarbon to provide or produce a gas containing hydrogen, carbon monoxide, and/or carbon dioxide. The reformer 130 can include one or more combinations of reformers and reforming exchangers in any series, parallel, or series/parallel combination. For example, the reformer 130 can include an autothermal reformer ("ATR") in series with a reforming exchanger. In another example, the reformer 130 can include a KBR Reforming Exchanger System ("KRES") which can be operated using compressed air as an oxidant, potentially eliminating the need for an upstream air separation unit. In still another example, the reformer 130 can include an "Autothermal Reformer-Reforming Exchanger Arrangement for Hydrogen Production," as discussed and described in U.S. Pat. No. 7,220,505, which is incorporated by reference herein.

The first mixture in line 135 can have a hydrogen concentration ranging from about 30 mol % to about 80 mol %, about 40 mol % to about 70 mol %, or about 45 mol % to about 60 mol %. The first mixture in line 135 can have a nitrogen concentration ranging from about 10 mol % to about 40 mol %, about 10 mol % to about 30 mol %, or about 20 mol % to about 35 mol %. The first mixture in line 135 can have a carbon dioxide concentration ranging from about 4 mol % to about 15 mol %, about 5 mol % to about 12 mol % or about 6 mol % to about 10 mol %. The first mixture in line 135 can have a carbon monoxide concentration ranging from about 5 mol % to about 16 mol %, about 8 mol % to about 15 mol %, or about 10 mol % to about 14 mol %.

The first mixture via line 135 can be introduced to the converter 140 to provide or produce a gas mixture or "second mixture" via line 145. Within the converter 140, water and carbon monoxide can react to form carbon dioxide and additional hydrogen. The second mixture in line 145 can include, but is not limited to, nitrogen, hydrogen, carbon dioxide, carbon monoxide, argon, water and methane. The second mixture in line 145 can have a hydrogen concentration ranging from about 30 mol % to about 80 mol %, about 40 mol % to about 70 mol %, or about 45 mol % to about 60 mol %. The second mixture in line 145 can have a nitrogen concentration ranging from about 10 mol % to about 40 mol %, about 10 mol % to about 30 mol %, or about 20 mol % to about 35 mol %. The second mixture in line 145 can have a carbon dioxide concentration ranging from about 5 mol % to about 19 mol %, about 10 mol % to about 19 mol % or about 15 mol % to about 19 mol %. The second mixture in line 145 can have a carbon monoxide concentration ranging from about 0.1 mol % to about 15 mol %, about 0.1 mol % to about 10 mol %, or about 0.1 mol % to about 5 mol %.

The converters 140 can include one or more high, medium, and/or low temperature shift converters arranged in any combination or configuration, including series, parallel, or series/parallel combination. The high temperature shift converter can be a conventional design using one or more iron and/or iron/chromium based catalysts. The low temperature shift converter can be a conventional design using one or more copper based catalysts.

The second mixture via line 145 can be introduced to one or more carbon dioxide separators ("first separation zones") 150 to produce a gas mixture or "third mixture" via line 155 and carbon dioxide via line 157. Carbon dioxide can be selectively separated from the second mixture within the first separation zone 150. The third mixture in line 155 can include, but is not limited to, hydrogen, nitrogen, argon and trace quantities of carbon monoxide and carbon dioxide. The hydrogen concentration in the third mixture in line 155 can range from about 35 mol % to about 95 mol %, about 50 mol % to about 90 mol %, or about 55 mol % to about 75 mol %. The third mixture in line 155 can have a nitrogen concentration ranging from about 4 mol % to about 64 mol %, about 9 mol % to about 49 mol %, or about 24 mol % to about 44 mol %. The third mixture in line 155 can have a carbon dioxide concentration ranging from about 0.1 mol % to about 0.9 mol %, about 0.1 mol % to about 0.7 mol %, or about 0.1 mol % to about 0.5 mol %. The third mixture in line 155 can have a carbon monoxide concentration ranging from about 0.1 mol % to about 0.9 mol %, about 0.3 mol % to about 0.9 mol %, or about 0.5 mol % to about 0.9 mol %. The third mixture in line 155 can have an argon concentration ranging from about 0.1 mol % to about 0.9 mol %, about 0.1 mol % to about 0.7 mol % or about 0.1 mol % to about 0.5 mol %.

The one or more carbon dioxide separators 150 can include any one or a combination of physical, mechanical, electrical and/or chemical carbon dioxide separation systems configured in series, parallel, or any combination thereof. For example, the carbon dioxide separator 150 can include physical separation systems including, but not limited to, membrane type separation systems. In another example, the carbon dioxide separator 150 can include chemical separation systems including, but not limited to, absorbtion/desorbtion type, solvent-based, systems.

The third mixture via line 155 can be introduced to the methanator 160 to provide or produce a gas mixture via line 165 having a reduced concentration of carbon monoxide and carbon dioxide relative to the third mixture in line 155. At least a portion of any carbon monoxide and carbon dioxide in the third mixture can be converted to methane, thereby providing a gas mixture via line 165 having less than 500 ppmw total of carbon monoxide and carbon dioxide.

The one or more methanators 160 can include any one or a combination of physical, mechanical, electrical and/or chemical systems to convert trace quantities of carbon monoxide and carbon dioxide to methane, configured either in series, parallel, or any combination thereof. For example, the one or more methanators 160 can include one or more catalytic reactors arranged in series or parallel, containing a catalyst suitable for the conversion of carbon monoxide and carbon dioxide to methane, thereby providing a finished gas stream containing trace quantities (i.e. less than 500 ppmw) of total carbon monoxide and carbon dioxide. Suitable catalysts for methanization can include one or more nickel and/or nickel based composite catalysts.

The syngas mixture via line 165 can be mixed with a second recycle gas inline 197. The second recycle gas can include, but is not limited to, nitrogen and hydrogen. The pressure of the resultant gas mixture in line 167 can be increased within the compressor 170 to provide or produce a compressed gas mixture via line 205. The pressure of the compressed gas mixture via line 205 can range from about 1,000 kPa (130 psig) to about 20,800 kPa (3,000 psig), about 2,000 kPa (275 psig) to about 13,700 kPa (1,975 psig), or about 3,000 kPa (420 psig) to about 10,400 kPa (1,495 psig). The temperature of the compressed gas mixture in line 205 can range from about −100° C. (−150° F.) to about 100° C. (210° F.), about −50° C. (−60° F.) to about 50° C. (125° F.), or about −25° C. (−15° F.) to about 25° C. (80° F.).

The compressed gas mixture in line 205 can include, but is not limited to, nitrogen, hydrogen, argon, carbon monoxide, carbon dioxide, mixtures thereof or any combination thereof. The compressed syngas mixture in line 205 can have a hydrogen concentration ranging from about 40 mol % to about 85 mol %, about 50 mol % to about 80 mol %, or about 55 mol % to about 75 mol %. The compressed syngas mixture in line 205 can have a nitrogen concentration ranging from about 10 mol % to about 50 mol %, about 20 mol % to about 45 mol %, or about 25 mol % to about 40 mol %. The compressed syngas mixture in line 205 can have a methane concentration ranging from about 0.5 mol % to about 10 mol %, about 1 mol % to about 7 mol %, or about 1 mol % to about 5 mol %. The compressed syngas mixture in line 205 can have an oxygen concentration ranging from about 0.1 mol % to about 5 mol %, about 0.5 mol % to about 4 mol %, or about 0.8 mol % to about 3 mol %. The compressed syngas mixture in line 205 can have an argon concentration ranging from about 0.05 mol % to about 2 mol %, about 0.1 mol % to about 1.5 mol %, or about 0.1 mol % to about 1 mol %.

The compressed gas mixture via line 205 can be introduced to the separator ("second separation zone") 200 to provide or produce an essentially contaminant-free or substantially contaminant-free gas mixture or "first gas" or "purified syngas" via line 270. Contaminants such as argon, oxygen, and/or methane can be selective separated or otherwise removed from the compressed gas mixture within the second separation zone 200. The separator 200 can be used to remover or separate any contaminants, including excess nitrogen, i.e. nitrogen in excess of that necessary to provide a hydrogen-to-nitrogen molar ratio of from about 2.2:1 to about 3.2:1, from the compressed gas mixture in line 205. The one or more separators 200 can include one or more cryogenic-type separators operating at a temperature less than −150° C. (−238° F.). The one or more contaminants and/or excess nitrogen can be removed from the one or more separators 200 as a waste gas ("second gas") via line 260.

The first gas via line 270 can exit the separator 200. The molar ratio of hydrogen-to-nitrogen in the first syngas in line 270 can range from about 1.5:1 to about 5.0:1; from about 2.0:1 to about 4.0:1; or from about 2.2:1 to about 3.2:1. The first syngas in line 270 can have a hydrogen concentration ranging from about 50 mol % to about 90 mol %, about 60 mol % to about 85 mol %, or about 70 mol % to about 80 mol %. The first syngas in line 270 can have a nitrogen concentration ranging from about 10 mol % to about 40 mol %, about 15 mol % to about 35 mol %, or about 20 mol % to about 30 mol %. The first syngas in line 270 can have a methane concentration ranging from about 0.001 mol % to about 0.05 mol %, about 0.002 mol % to about 0.03 mol %, or about 0.005 mol % to about 0.01 mol %. The first syngas in line 270 can have an argon concentration ranging from about 0.05 mol % to about 2 mol %, about 0.1 mol % to about 1.5 mol %, or about 0.1 mol % to about 1 mol %.

The first gas via line 270 can be introduced to the ammonia converter 180 to provide or produce one or more ammonia products via line 185. At least a portion of the nitrogen and hydrogen in the first gas can be combined within the ammonia converter 180 to form the ammonia product via line 185. Non-reacted hydrogen and/or nitrogen can be present in the ammonia product in line 185. The ammonia converter 180 can be conventional single or multi-pass converters using one or more magnetite catalysts. In another example, the ammonia converters 180 can be single or multi-pass converters using one or more noble metal catalysts, or one or more catalysts based upon ruthenium, such as the ruthenium-based KAAP catalyst available from Kellogg, Brown and Root. The use of one or more higher activity, noble metal, catalysts can allow the use of lower pressures within the ammonia synthesis loop, thereby permitting use of a single barrel ammonia compressor 170.

The ammonia product in line 185 can have an ammonia concentration ranging from about 1 mol % to about 40 mol %, 3 mol % to about 30 mol %, or about 5 mol % to about 20 mol %. The ammonia product in line 185 can have a hydrogen concentration ranging from about 30 mol % to about 80 mol %, about 40 mol % to about 75 mol %, or about 50 mol % to about 70 mol %. The ammonia produce in line 185 can have a nitrogen concentration ranging from about 5 mol % to about 40 mol %, about 10 mol % to about 35 mol % or about 15 mol % to about 30 mol %.

The one or more ammonia converters 180 can include any reactor intended to operate at elevated pressures and/or temperatures to convert at least a portion of a feed gas containing nitrogen and hydrogen to ammonia. For example, the one or more ammonia converters 180 can include one or more "Split-Flow Ammonia Converters" as discussed and described in U.S. Pat. No. 7,081,230. In another example, the one or more ammonia converters 180 can include one or more "Isothermal Ammonia Converters" as discussed and described in U.S. Pat. No. 6,171,570. In still another example, the one or more ammonia converters 180 can include one or more "Horizontal Ammonia Converter Adapted for High Activity Catalyst" as discussed and described in U.S. Pat. No. 6,132,687.

The ammonia product via line 185 can be introduced to the one or more ammonia condensers 190 to provide or produce a product (the "finished product") via line 195, a first recycle via line 193, and a second recycle via line 197. The finished product in line 195 can include, but is not limited to, ammonia, hydrogen, and nitrogen. The finished product in line 195 can have a minimum ammonia concentration of about 85 wt %; about 90 wt %; about 95 wt %; or about 99.9 wt % ammonia. The finished product in line 195 can contain a maximum of about 15 wt %, about 10 wt %, about 5 wt % or about 0.1 wt % of combined hydrogen and nitrogen.

At least a portion of the hydrogen and/or nitrogen can be removed from the one or more ammonia condensers 190 as the first recycle via line 193. The hydrogen concentration in the first recycle in line 193 can range from about 40 mol % to about 90 mol %, about 50 mol % to about 85 mol %, or about 60 mol % to about 80 mol %. The nitrogen concentration in the first recycle in line 193 can range from about 10 mol % to about 60 mol %, about 15 mol % to about 50 mol %, or about 20 mol % to about 40 mol %.

At least a portion of the hydrogen and/or nitrogen can be removed from the one or more ammonia condensers 190 via the second recycle via line 197. The hydrogen concentration in the second recycle in line 197 can range from about 40 mol % to about 90 mol %, about 50 mol % to about 85 mol %, or about 60 mol % to about 80 mol %. The nitrogen concentration in the first recycle in line 197 can range from about 10 mol % to about 60 mol %, about 15 mol % to about 50 mol %, or about 20 mol % to about 40 mol %.

The one or more ammonia condensers 190 can include any mechanical or chemical system capable of selectively separating ammonia from a gas mixture including at least hydrogen and nitrogen. The ammonia condensers 190 can include one or more cryogenic purifiers containing one or more refrigeration exchangers and one or more refrigeration compressors.

Figure 2:
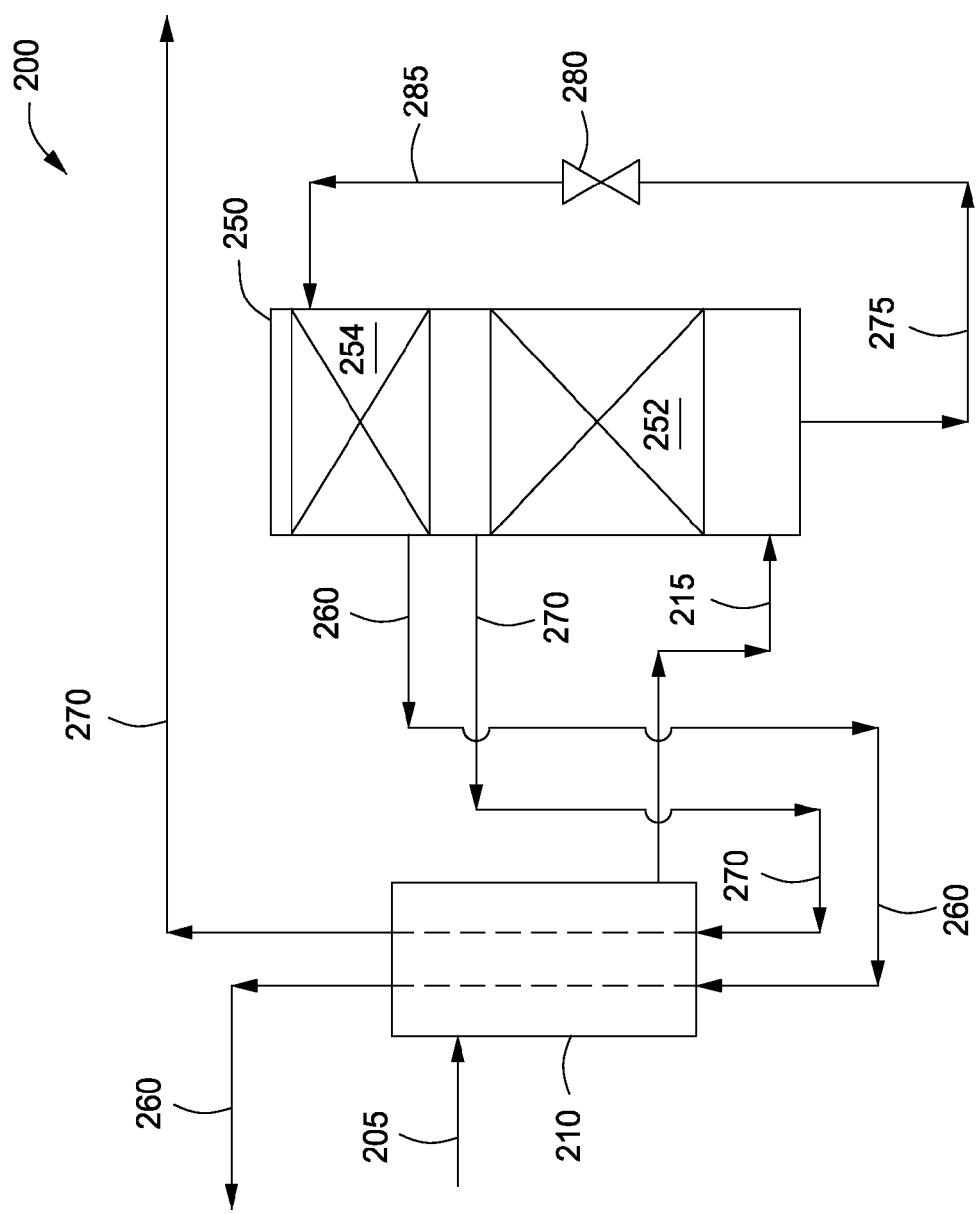
FIG. 2 depicts an illustrative separator system for cryogenically purifying a gas mixture, according to one or more embodiments described.

FIG. 2 depicts an illustrative separator system 200 for cryogenically purifying a gas mixture, according to one or more embodiments. The separator system 200 can include one or more heat transfer zones or units 210 and one or more separators 250. The compressed gas mixture in line 205 can expand and cool within the one or more heat transfer units ("first heat transfer units") 210, and the expanded, cool gas in line 215 can be introduced to the one or more separators ("first separators") 250 via line 215.

The compressed gas mixture in line 205 can expand and auto-refrigerate upon introduction to the one or more first heat transfer units 210, lowering both the temperature and the pressure of the compressed gas mixture introduced via line 205. Additional sensible cooling can be provided by routing the first gas in line 270 and the second gas in line 260 through the one or more first heat transfer units 210. The pressure of the expanded, cool gas in line 215 can range from about 1,000 kPa (130 psig) to about 15,000 kPa (2,160 psig), about 1,000 kPa (130 psig) to about 10,000 kPa (1,440 psig), or about 1,000 kPa (130 psig) to about 8,000 kPa (1,145 psig). The temperature of the expanded, cool gas in line 215 can range from about −200° C. (−330° F.) to about −50° C. (−60° F.), about −190° C. (−300° F.) to about −100° C. (−150° F.), or about −180° C. (−290° F.) to about −125° C. (−200° F.).

The one or more first heat transfer units 210 can include any device, system or combination of systems and/or devices suitable for transferring heat from a fluid at a higher temperature to a fluid at a lower temperature. The first heat transfer unit 210 can include, but is not limited to, single or multiple pass heat exchange devices such as shell and tube heat exchangers, plate and frame heat exchangers, spiral heat exchangers, bayonet type heat exchangers, U-tube heat exchangers and/or any similar system or device. The operating pressure of the first heat transfer unit 210 can range from about 1,000 kPa (130 psig) to about 15,000 kPa (2,160 psig), about 1,000 kPa (130 psig) to about 10,000 kPa (1,440 psig), or about 1,000 kPa (130 psig) to about 8,000 kPa (1,145 psig). The operating temperature of the first heat transfer unit 210 can range from about −200° C. (−330° F.) to about 100° C. (210° F.), about −190° C. (−310° F.) to about −75° C. (−100° F.), or about −180° C. (−300° F.) to about 50° C. (125° F.).

In the one or more first separators 250, the expanded, cool gas in line 215 can be selectively separated to form a first gas via line 270 having a hydrogen to nitrogen molar of about 3:1, i.e. suitable for the production of ammonia, a second gas via line 260 containing excess nitrogen, oxygen, argon, and carbon dioxide, and a bottoms via line 275 containing a liquefied waste gas. In one or more embodiments, the first separator 250 can have one or more stripping sections 252 and one or more condensing sections 254 disposed therein. As depicted in FIG. 2, the stripping section 252 and the condensing section 254 can be disposed vertically, such that condensate from the condensing section 254 can flow downward into the stripping section 252, thereby acting as a reflux within the stripping section 252.

A partially or completely liquefied waste gas can be withdrawn from the first separator 250 via line 275, and passed through one or more auto-refrigeration ("Joule-Thompson") valves 280 wherein the liquefied waste gas can expand and isentropically cool. The cooled waste gas can exit the one or more Joule-Thompson valves 280 via line 285 and can be recirculated through the condensing section 254 of the first separator 250, thereby providing the second gas via line 260. By returning at least a portion of the cooled waste gas in line 285 to the condensing section 254, the temperature within the condensing section 254 can be controlled, thereby assisting in the separation of the one or more contaminants, including oxygen, argon, carbon monoxide, and carbon dioxide from the hydrogen and nitrogen from the expanded, cool gas introduced to the separator 250 via line 215. The temperature, volume and composition of the first gas reflux from the condensing section 254 to the stripping section 252 can affect the composition of the first gas removed via line 270. For example, increasing the temperature in the first separator 250 by reducing reflux flow will increase the nitrogen concentration in the first gas removed from the separator via line 270, while reducing the first separator 250 temperature by increasing reflux flow will reduce the nitrogen concentration in the first gas removed from the separator via line 270.

The first gas in line 270 can include, but is not limited to, nitrogen, hydrogen, and trace quantities of contaminants, including but not limited to, argon, methane, or any combination thereof. The first gas in line 270 can have a hydrogen concentration ranging from about 50 mol % to about 90 mol %, about 60 mol % to about 85 mol %, or about 70 mol % to about 80 mol %. The first gas in line 270 can have a nitrogen concentration ranging from about 10 mol % to about 40 mol %, about 15 mol % to about 35 mol %, or about 20 mol % to about 30 mol %. The first gas in line 270 can have a methane concentration ranging from about 0.001 mol % to about 0.05 mol %, about 0.002 mol % to about 0.03 mol %, or about 0.005 mol % to about 0.01 mol %. The first gas in line 270 can have an argon concentration ranging from about 0.05 mol % to about 2 mol %, about 0.1 mol % to about 1.5 mol %, or about 0.1 mol % to about 1 mol %. The pressure in the first gas in line 270 at the inlet to the first heat transfer unit 110 can range from about 1,000 kPa (130 psig) to about 15,000 kPa (2,160 psig), about 1,000 kPa (130 psig) to about 10,000 kPa (1,435 psig), or about 1,000 kPa (130 psig) to about 8,000 kPa (1,145 psig). The temperature of the first gas in line 270 can range from about −200° C. (−325° F.) to about 50° C. (125° F.), about −175° C. (−280° F.) to about 25° C. (80° F.), or about −160° C. (−250° F.) to about 0° C. (30° F.).

The second gas in line 260 can include, but is not limited to, nitrogen, argon, methane, hydrogen, or any combination thereof. The second gas in line 260 can have a nitrogen concentration ranging from about 20 mol % to about 90 mol %, about 40 mol % to about 85 mol %, or about 60 mol % to about 80 mol %. The second gas in line 260 can have a methane concentration ranging from about 1 mol % to about 40 mol %, about 5 mol % to about 30 mol %, or about 10 mol % to about 25 mol %. The second gas in line 260 can have an argon concentration ranging from about 0.5 mol % to about 15 mol %, about 1 mol % to about 10 mol %, or about 2 mol % to about 10 mol %. The pressure of the second gas in line 260 at the inlet to the first heat transfer unit 210 can range from about 100 kPa (0 psig) to about 3,000 kPa (420 psig), about 100 kPa (0 psig) to about 2,000 kPa (275 psig), or about 100 kPa (0 psig) to about 1,000 kPa (130 psig). The temperature of the second gas in line 260 can range from about −200° C. (−330° F.) to about −50° C. (−60° F.), about −195° C. (−320° F.) to about −100° C. (−150° F.), or about −190° C. (−310° F.) to about −160° C. (−260° F.).

The liquefied waste in line 275 can include, but is not limited to, nitrogen, argon, methane, hydrogen, or any combination thereof. The liquefied waste in line 275 can have a nitrogen concentration ranging from about 20 mol % to about 90 mol %, about 40 mol % to about 85 mol %, or about 60 mol % to about 80 mol %. The liquefied waste in line 275 can have a methane concentration ranging from about 1 mol % to about 40 mol %, about 5 mol % to about 30 mol %, or about 10 mol % to about 25 mol %. The liquefied waste in line 275 can have an argon concentration ranging from about 0.5 mol % to about 15 mol %, about 1 mol % to about 10 mol %, or about 2 mol % to about 10 mol %. The pressure of the liquefied waste in line 275 can range from about 1,000 kPa (130 psig) to about 15,000 kPa (2,160 psig), about 1,000 kPa (130 psig) to about 10,000 kPa (1,435 psig), or about 1,000 kPa (130 psig) to about 8,000 kPa (1,145 psig). The temperature of the liquefied waste in line 275 can range from about −200° C. (−330° F.) to about −50° C. (−60° F.), about −195° C. (−320° F.) to about −100° C. (−150° F.), or about −190° C. (−310° F.) to about −150° C. (−240° F.).

The first separator 250 can include any system, device or combination of systems and/or devices suitable for separating an incoming vapor/liquid mixture into a bottoms, an intermediate, and an overhead. For example, the first separator 250 can have one or more stripping sections 252 and one or more condensing sections 254 disposed therein. In another example, the stripping section 252 can be a packed column containing rings, balls, saddles or similar materials to assist in the selective separation of the steam from the first mixture. In still another example, the stripping section 252 can include a plurality of trays to assist in the separation of waste gas from the syngas. The condensing section 254 can have a shell and tube "knock-back" type condenser mounted integrally within an upper portion of the column. The stripping section 252 and the condensing section 254 can be disposed in separate locations interconnected with process piping. The first separator 250 can be a partially or completely empty column. The first separator can operate at a pressure from about 1,000 kPa (130 psig) to about 15,000 kPa (2,160 psig), about 1,000 kPa (130 psig) to about 10,000 kPa (1,435 psig), or about 1,000 kPa (130 psig) to about 8,000 kPa (1,145 psig). The first separator can operate at a temperature from about −200° C. (−330° F.) to about 100° C. (210° F.), about −190° C. (−310° F.) to about −75° C. (−100° F.), or about −180° C. (−300° F.) to about 50° C. (125° F.).

The pressure of the liquefied waste gas in line 275 can be reduced using one or more pressure reducing devices 280 to provide or produce a cooled second gas reflux via line 285. The pressure reducing device 280 can be an isentropic expansion valve, for example, a Joule-Thompson valve. The autorefrigeration that occurs through the Joule-Thompson valve 280 can be used to provide additional cooling for the first separator 250. The pressure of the cooled waste gas reflux, introduced to the first separator 250 via line 285, can range from about 200 kPa (15 psig) to about 3,000 kPa (420 psig), about 200 kPa (15 psig) to about 2,000 kPa (275 psig), or about 200 kPa (15 psig) to about 1,000 kPa (130 psig). The temperature of the cooled waste gas reflux via line 285 can range from about −200° C. (−330° F.) to about −50° C. (−60° F.), about −195° C. (−320° F.) to about −100° C. (−150° F.), or about −190° C. (−310° F.) to about −160° C. (−260° F.).

The first gas via line 270 and the second gas via line 260 can be passed through the one or more first heat transfer units 210 to provide additional cooling to the compressed gas mixture in line 205. The pressure of the second gas in line 260 can range from about 200 kPa (30 psig) to about 3,000 kPa (420 psig), about 200 kPa (15 psig) to about 2,000 kPa (275 psig), or about 200 kPa (15 psig) to about 1,000 kPa (130 psig). The temperature of the second gas in line 260 can range from about −120° C. (−180° F.) to about 50° C. (120° F.), about −50° C. (−60° F.) to about 50° C. (120° F.), or about −10° C. (−15° F.) to about 50° C. (120° F.).

The pressure of the first gas in line 270 can range from about 1,000 kPa (130 psig) to about 15,000 kPa (2,160 psig), about 1,000 kPa (130 psig) to about 10,000 kPa (1,435 psig), or about 1,000 kPa (130 psig) to about 8,000 kPa (1,145 psig). The temperature of the first gas in line 270 can range from about −120° C. (−180° F.) to about 50° C. (120° F.), about −50° C. (−60° F.) to about 50° C. (120° F.), or about −10° C. (−15° F.) to about 50° C. (120° F.).

Figure 3:
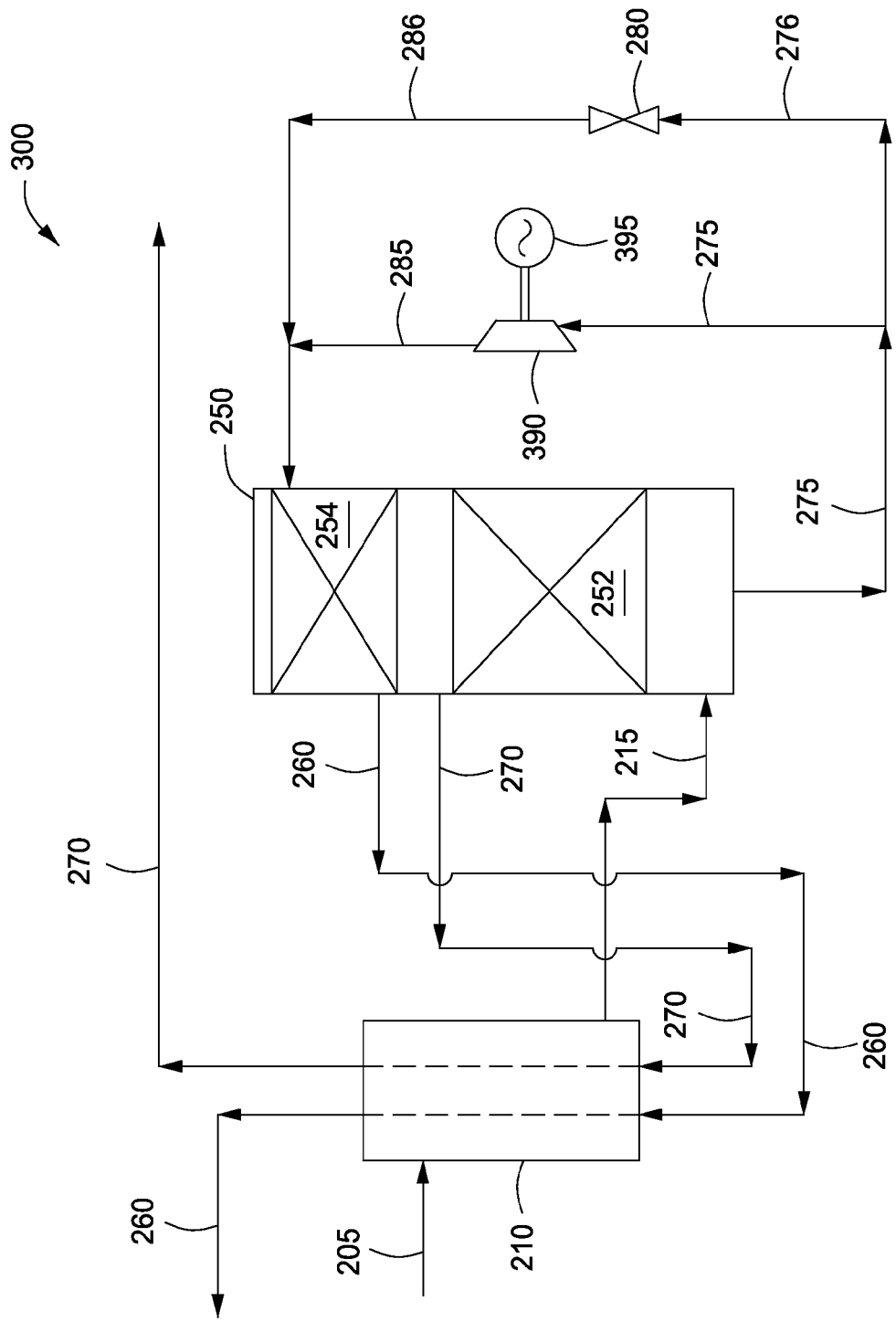
FIG. 3 depicts another illustrative separator system for cryogenically purifying a gas mixture, according to one or more embodiments described.

FIG. 3 depicts another illustrative separator system 300 for cryogenically purifying a gas mixture according to one or more embodiments. While similar to the separator system 200 depicted in FIG. 2, the separator system 300 depicted in FIG. 3 can include one or more expanders 390 in lieu of or in addition to the Joule-Thompson valve 280 depicted in FIG. 2.

The expansion of the liquefied waste gas in line 275 through the expander 390 can generate shaft power. The expander 390 can be a work output device receiving the liquefied waste gas via line 275 and producing a pure vapor or mixed liquid/vapor effluent via line 285. In one or more embodiments, the shaft power generated by the expander 390 can be used to directly drive one or more pieces of rotating process equipment. For example, the shaft power generated by the expander 390 can be used to turn an electrical generator 395, thereby providing electrical power.

At least a portion of the liquefied waste gas in line 275 can bypass the expander 390. The liquefied waste gas in line 275 can flow through one or more Joule-Thompson valves 280, similar to those depicted in FIG. 2 to provide or produce a cooled waste gas reflux via line 286. The cooled waste gas reflux in line 286 can be combined with the cooled waste gas reflux in line 285, and the combined stream can be returned to the first separator 250. The ability to bypass all or a portion of the liquefied waste gas in line 275 around the expander 390 and through the one or more Joule-Thompson valves 280 can provide: a more efficient startup and shutdown of the expander 390; the ability to maintain process operations should the expander 390 go offline; and/or the ability to handle a recycle flow greater than the rated capacity of the expander 390.

Figure 4:
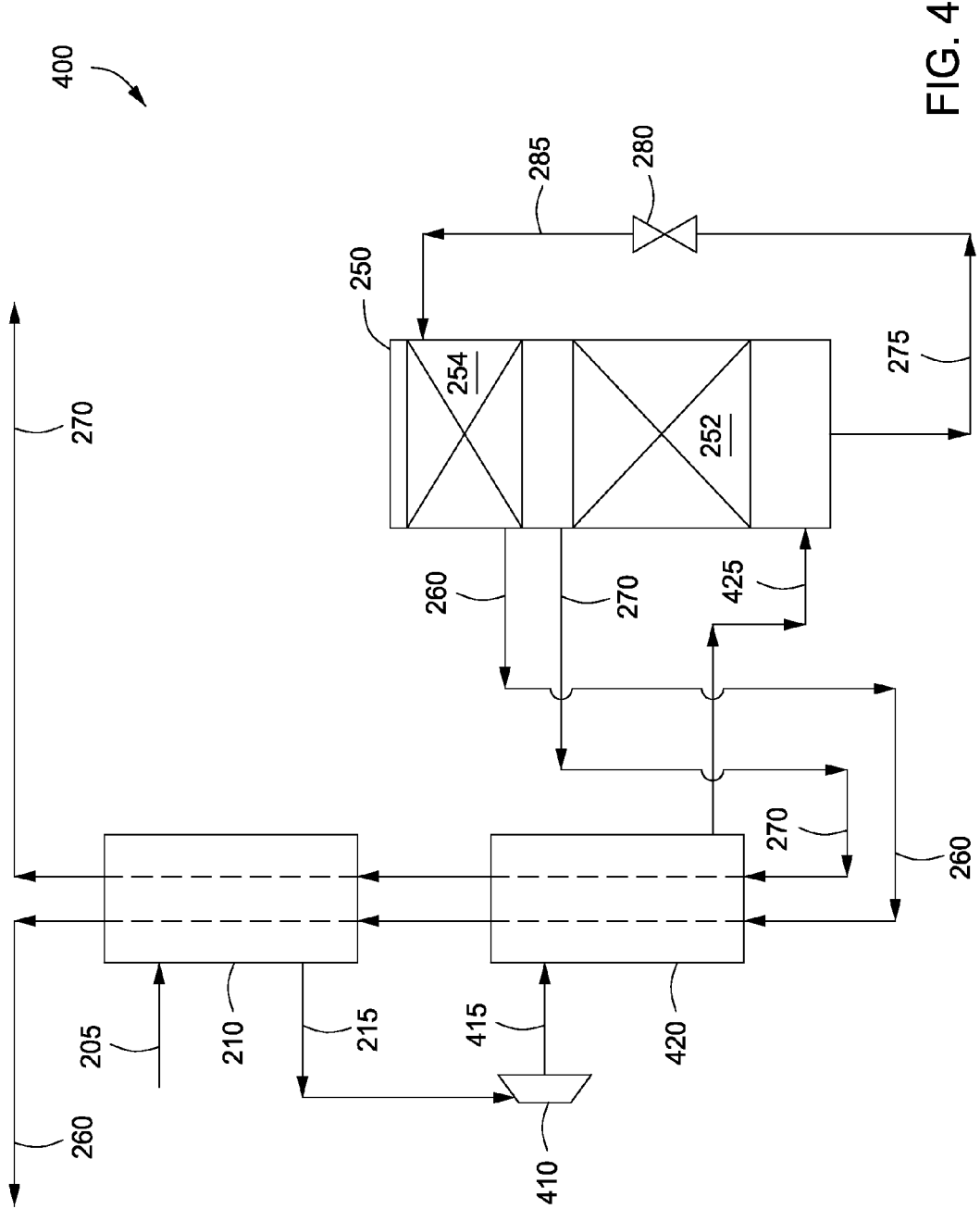
FIG. 4 depicts yet another illustrative separator system for cryogenically purifying a gas mixture, according to one or more embodiments described.

FIG. 4 depicts yet another illustrative separator system 400 for cryogenically purifying a gas mixture according to one or more embodiments. Similar to the separator systems 200 and 300 depicted in FIGS. 2 and 3, respectively, the incoming compressed gas mixture via line 205 can be cooled using the first heat transfer unit 210 to provide or produce the expanded, cool gas via line 215. At least a portion of the expanded, cool gas in line 215 can be directed through one or more expanders 410 to provide or produce an expanded gas via line 415. In one or more embodiments, the compressed syngas exiting the first heat transfer unit 210 can be introduced to one or more expanders 410 wherein the compressed syngas can expand, cooling and providing shaft power. In one or more embodiments, the turbo-expander 410 can be any device, system or combination of systems and/or devices suitable for converting the isentropic expansion of a gas stream to mechanical work and/or shaft power. In one or more embodiments, the turbo expander 410 can be a centrifugal or axial flow turbine through which a high pressure gas is expanded to produce work that used to drive process equipment or an electrical generator.

The expanded gas in line 415 can be introduced to one or more second heat transfer units 420 to provide or produce a second, cooled, expanded gas via line 425. In one or more embodiments, the pressure of the expanded gas in line 415 can range from about 1,000 kPa (130 psig) to about 10,000 kPa (1,435 psig), about 1,000 kPa (130 psig) to about 8,000 kPa (1,145 psig), or about 1,000 kPa (130 psig) to about 6,000 kPa (855 psig). In one or more embodiments, the temperature of the expanded gas in line 415 can range from about −190° C. (−310° F.) to about 0° C. (30° F.), about −180° C. (−290° F.) to about −50° C. (−60° F.), or about −180° C. (−290° F.) to about −100° C. (−150° F.).

The second heat transfer unit 420 can be any device, system or combination of systems and/or devices suitable for transferring heat from a fluid at a higher temperature to a fluid at a lower temperature. The second heat transfer unit 420 can include, but is not limited to, single or multiple pass heat exchange devices such as shell and tube heat exchangers, plate and frame heat exchangers, spiral heat exchangers, bayonet type heat exchangers, U-tube heat exchangers an/or any similar system or device. The operating pressure in the second heat transfer unit 420 can range from about 1,000 kPa (130 psig) to about 15,000 kPa (2,160 psig), about 1,000 kPa (130 psig) to about 10,000 kPa (1,435 psig), or about 1,000 kPa (130 psig) to about 8,000 kPa (1,145 psig). The operating temperature in the second heat transfer unit 420 can range from about −200° C. (−330° F.) to about 100° C. (210° F.), about −190° C. (−310° F.) to about −75° C. (−100° F.), or about −180° C. (−300° F.) to about 50° C. (125° F.).

The second, cooled, expanded gas via line 425 can be introduced to the first separator 250. The pressure of the second, cooled, expanded gas in line 425 can range from about 1,000 kPa (130 psig) to about 10,000 kPa (1,435 psig), about 1,000 kPa (130 psig) to about 8,000 kPa (1,145 psig), or about 1,000 kPa (130 psig) to about 6,000 kPa (855 psig). The temperature of the second, cooled, expanded gas via line 425 can range from about −190° C. (−310° F.) to about 0° C. (30° F.); about −180° C. (−290° F.) to about −50° C. (−60° F.), or about −180° C. (−290° F.) to about −100° C. (−150° F.).

Figure 5:
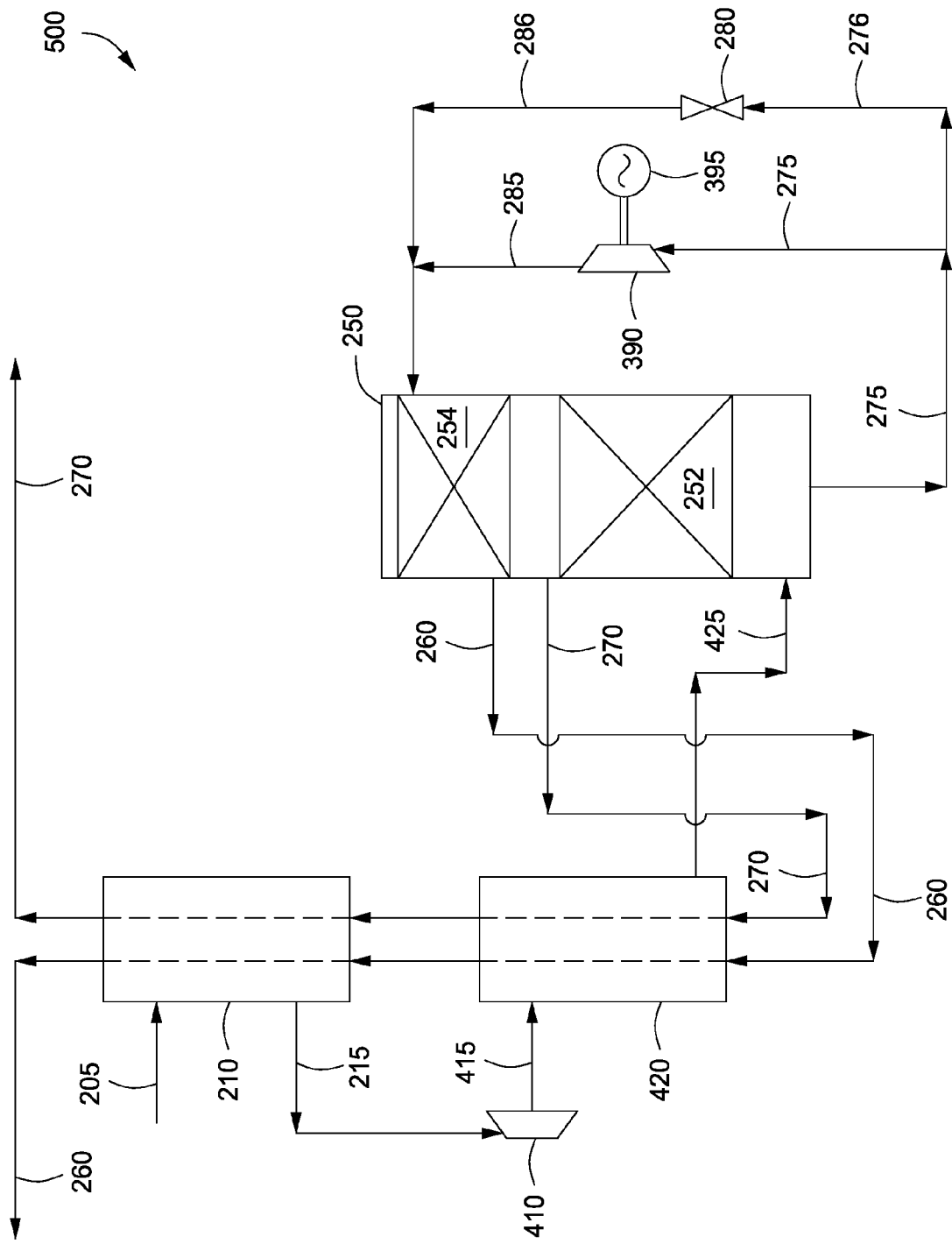
FIG. 5 depicts yet another illustrative separator system for cryogenically purifying a gas mixture, according to one or more embodiments described.

FIG. 5 depicts yet another illustrative separator system 500 for cryogenically purifying a gas mixture according to one or more embodiments described. While similar to the separator systems 200, 300, and 400 depicted in FIGS. 2-4, respectively, the separator system 500 depicted in FIG. 5 can include one or more expanders 390 to expand liquefied waste gas to generate power and one or more expanders 410 to provide additional cooling and power.

As mentioned above with reference to FIG. 4, the compressed gas mixture in line 205 can expand and auto-refrigerate upon introduction to the one or more first heat transfer units 210. At least a portion of the expanded, cool gas in line 215 can be directed through the one or more expanders 410 to provide or produce the expanded gas via line 415. The expanded gas in line 415 can be fed to the one or more second heat transfer units 420 to provide or produce the second, cooled, expanded gas via line 425. The expanded gas via line 425 can then be feed to the first separator 250 where the expanded, cool gas in line 215 can be selectively separated to form the first gas via line 270 suitable for the production of ammonia, the second gas via line 260 containing excess nitrogen, oxygen, argon, and carbon dioxide, and the bottoms via line 275 containing the liquefied waste gas.

And as mentioned above with reference to FIG. 3, the expander 390 can be any work output device that can receive the liquefied waste gas via line 275 and produce a pure vapor or mixed liquid/vapor effluent via line 285. At least a portion of the liquefied waste gas in line 275 can also bypass the expander 390. The liquefied waste gas in line 275 can flow through one or more Joule-Thompson valves 280 to provide a cooled waste gas reflux via line 286. The cooled waste gas reflux in line 286 can be combined with the cooled waste gas reflux in line 285, and the combined stream can be returned to the first separator 250.

Embodiments of the present invention further relate to any one or more of the following paragraphs:

1. A method for producing ammonia, comprising compressing a gas mixture comprising nitrogen, hydrogen, methane, and argon to produce a compressed gas mixture having a pressure of from about 1,000 kPa (130 psig) to about 10,400 kPa (1,495 psig); selectively separating all or a portion of the compressed gas mixture at cryogenic conditions to produce a first gas comprising nitrogen and hydrogen, and a second gas comprising methane, argon, residual hydrogen and nitrogen; and reacting at least a portion of the first gas at conditions sufficient to produce an ammonia product.

2. The method of paragraph 1, wherein selectively separating all or a portion of the compressed gas mixture at cryogenic conditions to produce the first gas comprises expanding at least a portion of the compressed gas mixture to produce a cooled gas mixture; stripping at least a portion of the cooled gas mixture under a reflux to produce a purified gas mixture and a liquefied waste, wherein a first portion of the purified gas mixture is removed to produce the first gas; expanding at least a portion of the liquefied waste to produce a cooled waste gas; and condensing a second portion of the purified gas mixture using the cooled waste gas to produce the reflux and a warmed waste gas, and withdrawing at least a portion of the warmed waste gas to produce the second gas.

3. The method of paragraph 2, wherein at least a portion of the liquefied waste is expanded to produce mechanical energy.

4. The method of paragraph 2 or 3, further comprising generating electrical power using the mechanical energy.

5. The method according to any one of paragraphs 1 to 4, wherein the hydrogen-to-nitrogen molar ratio of the first gas ranges from about 2.2:1.0 to about 3.2:1.0.

6. The method according to any one of paragraphs 1 to 5, further comprising drying at least a portion of the gas mixture prior to compressing the gas mixture.

7. The method according to any one of paragraphs 1 to 6, further comprising drying at least a portion of the compressed gas mixture prior to separating the compressed gas mixture.

8. The process according to any one of paragraphs 1 to 7, further comprising drying at least a portion of the first gas prior to converting the first gas.

9. The process according to any one of paragraphs 1 to 8, wherein the compressed gas mixture is cooled using at least a portion the first gas.

10. The process according to any one of paragraphs 1 to 9, wherein the compressed gas mixture is cooled using at least a portion of the second gas.

11. A method for producing ammonia, comprising compressing a gas mixture comprising nitrogen, hydrogen, carbon monoxide, and carbon dioxide, and having a hydrogen-to-nitrogen molar ratio of less than about 2.2:1, to produce a compressed gas mixture having a pressure of from about 1,000 kPa (130 psig) to about 10,400 kPa (1,495 psig); selectively separating all or a portion of the compressed gas mixture to produce a first gas comprising nitrogen and hydrogen, having a hydrogen-to-nitrogen molar ratio of from about 2.2:1 to about 3.2:1, and a second gas comprising carbon monoxide, and carbon dioxide, and wherein the selective separation occurs at a temperature of from about −200° C. (−325° F.) to about 0° C. (30° F.); and reacting at least a portion of the first gas at conditions sufficient to produce an ammonia product.

12. The method of paragraph 11, wherein selectively separating all or a portion of the compressed gas mixture at cryogenic conditions to produce the first gas comprises: expanding at least a portion of the compressed gas mixture to produce a cooled gas mixture; stripping at least a portion of the cooled gas mixture under a reflux to produce a purified gas mixture and a liquefied waste, wherein a first portion of the purified gas mixture is removed to produce the first gas; expanding at least a portion of the liquefied waste to produce a cooled waste gas; and condensing a second portion of the purified gas mixture using the cooled waste gas to produce the reflux and a warmed waste gas, and withdrawing at least a portion of the warmed waste gas to produce the second gas.

13. The method of paragraph 12, wherein at least a portion of the liquefied waste is expanded to produce mechanical energy.

14. The method of paragraph 12 or 13, further comprising generating electrical power using the mechanical energy.

15. The method according to any one of paragraphs 11 to 14, wherein the compressed gas mixture is cooled using at least a portion the first gas.

16. The method according to any one of paragraphs 11 to 15, wherein the compressed gas mixture is cooled using at least a portion of the second gas.

17. The method according to any one of paragraphs 11 to 16, further comprising drying at least a portion of the gas mixture prior to compressing the gas mixture.

18. The method according to any one of paragraphs 11 to 17, further comprising drying at least a portion of the compressed gas mixture prior to cryogenically separating the compressed gas mixture.

19. A system for producing ammonia comprising a reformation zone wherein one or more hydrocarbons are converted in the presence of one or more oxidants and steam, to produce a first mixture comprising carbon dioxide, carbon monoxide, hydrogen, nitrogen, argon, water, and methane; a conversion zone wherein the first mixture is converted in the presence of water, forming a second mixture comprising hydrogen, nitrogen, oxygen, argon, carbon dioxide and residual carbon monoxide; a first separation zone wherein at least a portion of the carbon dioxide is selectively separated from the second mixture, providing a gas mixture comprising hydrogen, nitrogen, argon, residual carbon dioxide and carbon monoxide, mixtures thereof, or combinations thereof; a methanation zone wherein at least a portion of the residual carbon dioxide and carbon monoxide in the second mixture is converted to methane and removed to produce a gas mixture comprising hydrogen, nitrogen, argon, water, and methane; a compression zone wherein the gas mixture is compressed, providing a compressed gas mixture; a second separation zone wherein the compressed gas mixture is selectively separated under cryogenic conditions to produce a first gas comprising hydrogen and nitrogen and having a hydrogen-to-nitrogen molar ratio of from about 2.2:1 to about 3.2:1, and a second gas comprising nitrogen, carbon monoxide, carbon dioxide and argon; and a reaction zone wherein at least a portion of the first gas is reacted at conditions sufficient to produce one or more ammonia products.

20. The system of paragraph 19, wherein the second separation zone comprises a first expansion zone wherein at least a portion of the compressed gas mixture is expanded to produce a cooled gas mixture; a stripping zone wherein at least a portion of the cooled gas mixture is stripped under a reflux to produce a purified gas mixture and a liquefied waste gas, and wherein a first portion of the purified gas mixture is removed to produce the first gas; a second expansion zone wherein at least a portion of the liquefied waste gas is expanded to produce a cooled waste gas; and a condensing zone wherein a second portion of the purified gas mixture is condensed using the cooled waste gas to produce the reflux and a warmed waste gas, and withdrawing at least a portion of the warmed waste gas to produce the second gas.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. A method for producing ammonia, comprising:
methanating a gas comprising about 4 mol % to about 64 mol % nitrogen, about 35 mol % to about 95 mol % hydrogen, about 0.1 mol % to about 0.9 mol % carbon monoxide, and about 0.1 mol % to about 0.9 mol % carbon dioxide to produce a gas mixture comprising about 10 mol % to about 50 mol % nitrogen, about 55 mol % to about 75 mol % hydrogen, and about 0.5 mol % to about 10 mol % methane;

introducing the gas mixture to a compressor to produce a compressed gas mixture having a pressure of about 1,000 kPa to about 20,800 kPa, wherein the compressed gas mixture has the same composition as the gas mixture entering the compressor;

selectively separating the compressed gas mixture at cryogenic conditions to produce a first gas comprising about 10 mol % to about 40 mol % nitrogen and about 60 mol % to about 90 mol % hydrogen, and a second gas comprising about 5 mol % to about 30 mol % methane, about 1 mol % to about 10 mol % argon, residual hydrogen, and about 40 mol % to about 85 mol % nitrogen; and reacting at least a portion of the first gas at conditions sufficient to produce an ammonia product.

2. The method of claim 1, wherein selectively separating all or a portion of the compressed gas mixture at cryogenic conditions comprises:

expanding at least a portion of the compressed gas mixture to produce a cooled gas mixture;

stripping at least a portion of the cooled gas mixture under a reflux to produce a purified gas mixture and a liquefied waste, wherein a first portion of the purified gas mixture is removed to produce the first gas;

expanding at least a portion of the liquefied waste to produce a cooled waste gas; and condensing a second portion of the purified gas mixture using the cooled waste gas to produce the reflux and a warmed waste gas, and withdrawing at least a portion of the warmed waste gas to produce the second gas.

3. The method of claim 2, wherein at least a portion of the liquefied waste is expanded to produce mechanical energy.

4. The method of claim 3, further comprising generating electrical power using the mechanical energy.

5. The method of claim 1, wherein the hydrogen-to-nitrogen molar ratio of the first gas ranges from about 2.2:1.0 to about 3.2:1.0.

6. The method of claim 1, further comprising drying at least a portion of the gas mixture prior to compressing the gas mixture.

7. The method of claim 1, further comprising drying at least a portion of the compressed gas mixture prior to separating the compressed gas mixture.

8. The process of claim 1, further comprising drying at least a portion of the first gas prior to reacting at least a portion of the first gas at conditions sufficient to produce an ammonia product.

9. The process of claim 1, wherein the compressed gas mixture is cooled using at least a portion the first gas.

10. The process of claim 1, wherein the compressed gas mixture is cooled using at least a portion of the second gas.

11. A method for producing ammonia, comprising:

methanating a gas comprising about 4 mol % to about 64 mol % nitrogen, about 35 mol % to about 95 mol % hydrogen, about 0.1 mol % to about 0.9 mol % carbon monoxide, and about 0.1 mol % to about 0.9 mol % carbon dioxide to produce a gas mixture comprising carbon monoxide, carbon dioxide, about 10 mol % to about 50 mol % nitrogen, about 55 mol % to about 75 mol % hydrogen, and about 0.5 mol % to about 10 mol % methane;

introducing the gas mixture to a compressor to produce a compressed gas mixture having a pressure of about 1,000 kPa to about 20,800 kPa, wherein the compressed gas mixture has the same composition as the gas mixture entering the compressor;

selectively separating the compressed gas mixture to produce a first gas having a hydrogen-to-nitrogen molar ratio of from about 2.2:1 to about 3.2:1, and a second gas comprising about 1 mol % to about 10 mol % argon, about 40 mol % to about 85 mol % nitrogen, carbon monoxide, and carbon dioxide, wherein the selective separation occurs at a temperature of from about −200° C. to about 0° C.; and reacting at least a portion of the first gas at conditions sufficient to produce an ammonia product.

12. The method of claim 11, wherein selectively separating all or a portion of the compressed expanded gas mixture at cryogenic conditions to produce the first gas comprises:

expanding at least a portion of the compressed gas mixture to produce a cooled gas mixture;

stripping at least a portion of the cooled gas mixture under a reflux to produce a purified gas mixture and a liquefied waste, wherein a first portion of the purified gas mixture is removed to produce the first gas;

expanding at least a portion of the liquefied waste to produce a cooled waste gas; and condensing a second portion of the purified gas mixture using the cooled waste gas to produce the reflux and a warmed waste gas, and withdrawing at least a portion of the warmed waste gas to produce the second gas.

13. The method of claim 12, wherein at least a portion of the liquefied waste is expanded to produce mechanical energy.

14. The method of claim 13, further comprising generating electrical power using the mechanical energy.

15. The method of claim 11, wherein the compressed gas mixture is cooled using at least a portion the first gas.

16. The method of claim 11, wherein the compressed gas mixture is cooled using at least a portion of the second gas.

17. The method of claim 11, further comprising drying at least a portion of the gas mixture prior to compressing the gas mixture.

18. The method of claim 11, further comprising drying at least a portion of the compressed gas mixture prior to cryogenically separating the compressed gas mixture.

19. The method of claim 1, further comprising:

converting one or more hydrocarbons in the presence of one or more oxidants and steam, to produce a first mixture comprising carbon dioxide, carbon monoxide, hydrogen, nitrogen, argon, water, and methane;

converting the first mixture in the presence of water, forming a second mixture comprising hydrogen, nitrogen, methane, argon, carbon dioxide and residual carbon monoxide; and separating at least a portion of the carbon dioxide from the second mixture to provide the gas to be methanated.

20. The method of claim 1, wherein the compressed gas mixture has a pressure of from about 10,400 kPa to about 20,800 kPa.

* * * * *